United States Patent Office 3,511,599
Patented May 12, 1970

3,511,599
CYCLIC PROCESS FOR REMOVAL OF ACID
RADICALS FROM AQUEOUS MEDIA USING
LEAD OXIDE OR BASIC LEAD CARBONATE
Ernesto Suriani, Freehold, N.J., assignor to Pullman
Incorporated, Chicago, Ill., a corporation of Delaware
Continuation-in-part of application Ser. No. 526,414,
Feb. 10, 1966. This application Sept. 19, 1966, Ser.
No. 580,309
Int. Cl. C02c 5/02; C01g 21/16, 21/14
U.S. Cl. 23—71                          39 Claims

ABSTRACT OF THE DISCLOSURE

A cyclic process for treatment of an aqueous medium containing a dissolved compound comprising an acid radical such as mineral acids, organic acidic compounds, water-soluble metal salts and ammonium salts to lower the concentration of dissolved acid radical which includes treatment of the aqueous medium with lead oxide, basic lead carbonate or mixtures thereof to form a precipitate of lead and the acid radical which precipitate is then separated from the clarified aqueous medium and subjected to a reducing environment to form elemental lead from which the lead oxide or basic lead carbonate precipitant is regenerated for reuse in the precipitation step. In addition to application of the process to purify waste waters, the process may also be applied such that at least a portion of the acid radical which is removed from the solution is converted to a valuable product such as phosphorus when the acid radical is phosphate, sulfur dioxide when the acid radical is sulfate, ammonia when an ammonium salt is the source of the acid radical and hydrogen halide when the acid radical is halide.

---

Figure 1:
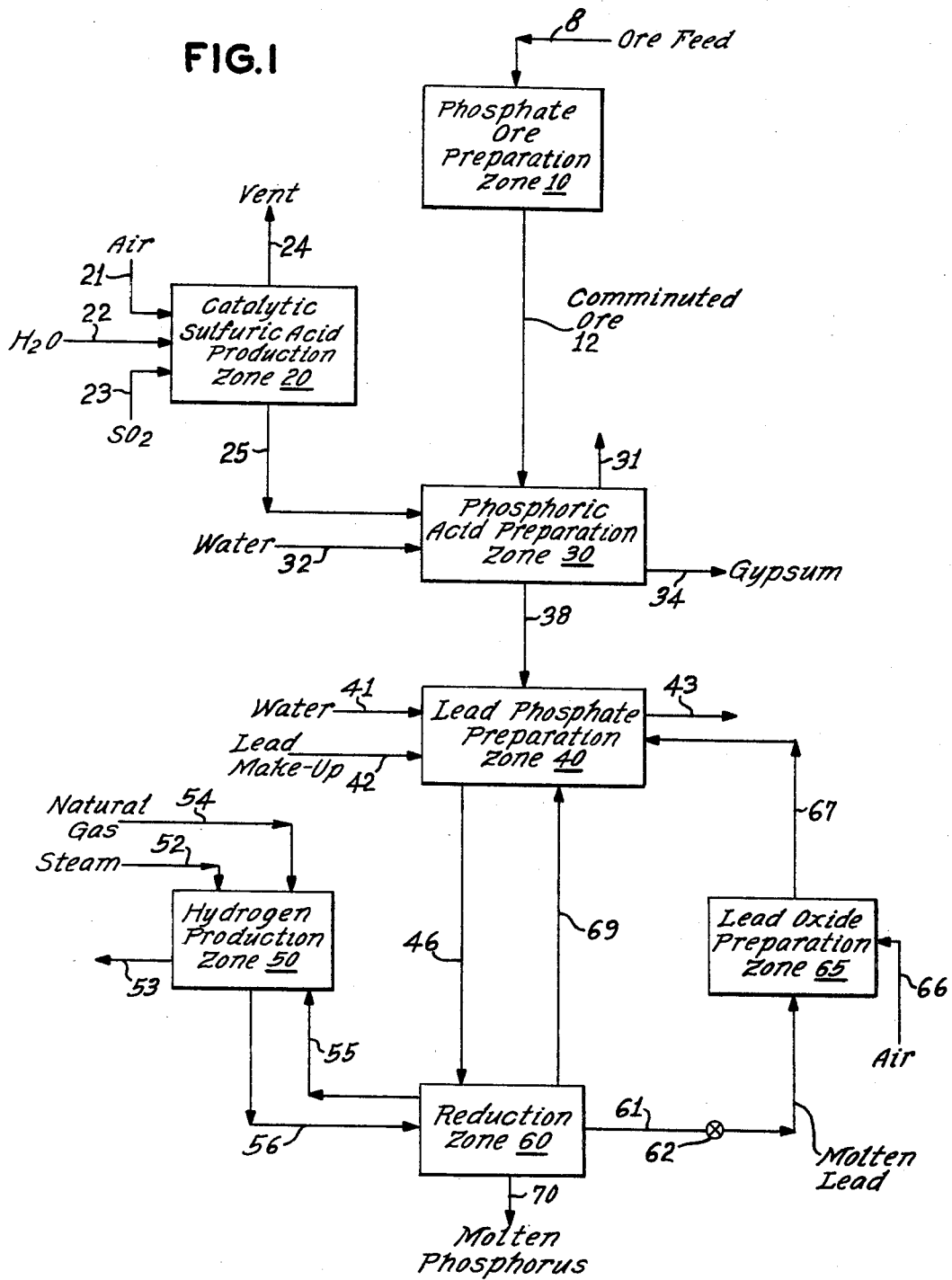

This application is a continuation-in-part of my prior and copending application Ser. No. 526,414, filed Feb. 10, 1966, now abandoned.

The present invention relates to a method for the removal of ions of the cationic and anionic type from materials containing the same. In accordance with one aspect of the present invention, a particular method is provided for the treatment of waste liquors contaminated with a material comprising an acid radical to free the liquors of the contaminant such that the resulting liquor can be disposed of as desired without eventual pollution of waterways. In accordance with another aspect of the present invention, a particular method is provided for the recovery from a low value material comprising an acid radical in association with hydrogen, ammonium or metal cations, of at least a portion of the material as a valuable product of the process and without the formation of by-product which would otherwise be of little value and cause a pollution problem in its disposal.

An ever increasing problem today is the pollution of waterways by agricultural, mining, industrial and household waste liquors containing a variety of contaminants of which phosphate, sulfate, nitrate and chloride bearing materials are but typical examples. For example, in the steel industry spent sulfuric acid and hydrochloric acid pickling liquors usually contain ferrous sulfate and ferrous chloride and, although the spent acids containing a relatively high content of such salts can be temporarily disposed of in deep wells, the salts gradually seep into the ground, drain into waterways and cause a pollution problem. Contamination is also derived from mining operations in which mineral acids are used to extract ore. For example, in the processing of ilmenite ore to separate titania from iron oxide, the ore is treated with sulfuric acid to dissolve the iron oxide as ferrous sulfate which is desirably disposed of by other than simply dumping into wells, streams or sea. A serious water hazard also arises from the ever increasing concentration in ground water of acid values derived from nitrate and phosphate fertilizer which values eventually reach river water as drain off from agricultural lands. Phosphate values derived from detergents also cause a serious pollution problem either by disposal through household sewage or in waste liquor at the chemical manufacturing plant site. Another industrial by-product of relatively little commercial value which requires disposal is calcium chloride. Large amounts of the latter compound are formed, for example, in the well-known Solvay process for producing sodium carbonate in which ammonia is recovered from ammonium chloride by-product by treatment of the latter with lime. Aside from the very serious pollution problem caused by these various phosphate, nitrate, sulfate and chloride by-products, the mere disposal thereof also results in waste of otherwise valuable chemicals such as phosphorus, nitrogen, sulfur and chloride.

It is an object of this invention therefore to provide a novel method for the removal of ions from materials containing the same.

Another object is to provide a method for the purification of various waste liquors containing a contaminant comprising an acid radical such as in particular sulfate, phosphate, nitrate and halide radicals.

Another object is to provide a method for the removal of compounds comprising an acid radical in association with hydrogen, ammonium and metal cations from aqueous solutions containing the same and to convert at least a portion of the compound which is removed to a valuable product of the process.

Another object is to provide a method for the treatment of an aqueous solution comprising sulfate to remove sulfate from the solution and to recover the sulfur value in a usable form.

A further object is to provide a method for the treatment of a phosphate bearing material to recover the phosphorus value therefrom.

A further object is to provide a method for the removal of halide from materials containing the same which method results in the release of the halide value in the form of hydrogen halide.

A still further object is to provide an improvement in the conversion of ammonium chloride to ammonia which method avoids the formation of calcium chloride by-product.

Various other objects and advantages of this invention will become apparent to those skilled in the art from the accompanying description and disclosure.

Accordingly, the above objects are generally accomplished by providing the method which comprises in combination the steps of reacting a material containing a compound comprising an acid radical with a precipitant comprising a lead compound selected from at least one of the group consisting of lead oxide and basic lead carbonate to precipitate a compound comprising lead and the acid radical, reacting the resulting precipitate in a reducing environment to form elemental lead and a second product comprising at least a portion of the acid radical, reconverting the elemental lead to the precipitant form and recycling the latter to the precipitation step.

The precipitation reaction is carried out in an aqueous medium under temperature and pressure conditions such that the aqueous medium is maintained in the liquid phase. The aqueous precipitation reaction medium is suitably maintained at a temperature from about 15° C., to the boiling point of the solution which at atmospheric pressure is usually about 110° C. In addition to the formation of a lead salt of the acid radical, which was dissolved in the aqueous medium, a second product derived from the cations with which the anion was originally associated in the solution treated is also formed. The reaction product comprising the precipitated lead salt is separated from the aqueous precipitation medium, is preferably at least partially dried and is then reacted in a reducing environment such as a hydrogen-containing gas to convert the combined lead to elemental lead, preferably in the molten phase, and the precipitant is then regenerated from the elemental lead and recycled to the precipitation step. In this manner a continuous, regenerative cyclic process is provided having a number of important advantages. In addition to the capability of reducing the concentration of the contaminant in the solution being treated to a level down to about 1–1000 parts per million or less such that the remaining aqueous medium is purified of the undesirable contaminant, the method also leads to the formation of a recoverable product of the process derived from a constituent part of either one or both of the anionic and cationic portions of the compound which is removed from the aqueous solution treated.

As stated above, the precipitant employed in the practice of this invention comprises at least one of lead oxide or basic lead carbonate. The term "lead oxide" as used herein refers to lead monoxide (PbO) and is intended to include both the anhydrous and hydrated forms thereof. The term "basic lead carbonate" as used herein refers to a compound having at least one and usually not more than two moles of lead carbonate, $PbCO_3$, combined with one mole of lead monoxide, and also includes both the anhydrous and hydrated forms of basic lead carbonate such as, for example, $PbCO_3 \cdot PbO$ and $PbCO_3 \cdot PbO \cdot H_2O$ (also expressed as $PbCO_3 \cdot Pb(OH)_2$), including the intermediate forms. It is to be understood that the basic lead carbonate may be introduced to the precipitation reaction zone as such or it may be formed in situ such as by introducing lead oxide to the precipitation zone and passing carbon dioxide through the aqueous precipitation reaction medium. Included within the scope of the present invention is the use of lead oxide and basic lead carbonate in combination with one another in any proportion, as well as in combination with impurities such as antimony, silver, iron and titanium compounds depending upon the original, natural or other source. For example, an economic source of lead in combination with antimony is scrap lead storage batteries, the lead content of which usually ranges from about 87 to about 93 percent by weight of the lead-antimony alloy. Suitable precipitants for use in the method of this invention are derived from such alloys by oxidation thereof with and without the presence of carbon dioxide.

In the precipitation step of the method of this invention, the precipitant comprising at least one of lead oxide or basic lead carbonate is reacted with an aqueous solution containing a material comprising an acid radical in an amount sufficient to form a water insoluble precipitate comprising lead and the acid radical. The term "acid radical" is used herein in its commonly accepted meaning and has reference to a mono- or polyvalent radical derived from a mono- or polyvalent acid by substracting one or more hydrogen atoms from the acid. One class of acid radicals which are removed from solutions containing the same upon treatment with the lead oxide or basic lead carbonate to form the corresponding lead salt are inorganic anions derived from a mineral acid. Such acid radicals include: (1) anions derived from oxygenated inorganic acids such as: phosphoric, phosphorous, sulfuric, sulfurous, nitric, perchloric, bromic, boric, manganic, permanganic, vanadic, chromic, perchromic, molybdic, tungstic, arsenic, silicic and selenic acids including the ortho-, meta-, and pyro-forms; and (2) anions derived from non-oxygenated inorganic acids also referred to as hydracids, HY, in which H is hydrogen and Y is any one of the halogens or other non metallic element including sulfur and selenium such as hydrochloric, hydrobromic acid, hydrofluoric acid, hydrogen sulfide and hydrogen selenide. A second class of acid radicals which are advantageously precipitated from materials containing the same by the method of this invention are those derived from organic compounds which give an acid reaction in water such as aliphatic and aromatic mono- or polybasic carboxylic acids, phenols, and aromatic sulfonic acids. Typical examples of such acid radicals comprising an organic group are those derived from benzoic acid; fatty acids such as stearic acid; phenol and ortho-dihydroxyphenol; and benzene sulfonic acid. It is to be understood that although for convenience of definition, the acid radical is referred to as one derived from one of the aforesaid mineral acids or organic acidic compounds, the acid radical may be present in the precipitation reaction medium in association with various cations including hydrogen, ammonium and metal cations. In addition to realizing the removal of the acid radical during the precipitation step, a further advantage of the method of this invention is that the cation with which the acid radical is in association is also removed from the solution being treated.

Accordingly, while reducing the concentration of the acid radical dissolved in the solution being treated, the precipitation reaction also leads to conversion of the cation with which the anion is originally in association in the solution treated, to a form which is either innocuous (e.g., water) or which is readily physically separated from the solution as either a volatile compound or water-insoluble compound. When the solution being treated comprises one or more of the aforesaid mineral acids or organic acidic compounds, the cation is hydrogen and during the precipitation of the acid radical as lead salt the hydrogen is converted to water. For example, when the mineral acid to be removed from solution by the method of this invention, is hydrochloric acid, the precipitation reaction is carried out such that lead oxychloride is precipitated and water is formed as typically represented by the reactions of the following Equations 1 and 2:

$$2PbO + 2HCl \rightarrow PbO \cdot PbCl_2 + H_2O \quad (1)$$

$$PbCO_3 \cdot Pb(OH)_2 + 2HCl \rightarrow PbO \cdot PbCl_2 + 2H_2O + CO_2 \quad (2)$$

Similar reactions occur when the solution treated comprises sulfuric acid as shown by the following equations:

$$PbO + H_2SO_4 \rightarrow PbSO_4 + H_2O \quad (3)$$

$$PbCO_3 \cdot Pb(OH)_2 + 2H_2SO_4 \rightarrow 2PbSO_4 + 3H_2O + CO_2 \quad (4)$$

When the solution being treated comprises phosphoric acid, the reaction proceeds to produce a mixture of dibasic, monobasic and tribasic (or ortho) phosphates, the dibasic and monobasic compounds losing water during the subsequent drying step to form pyro- and metaphosphates, respectively, the various reactions being illustrated by the following equations:

$$2PbO + 2H_3PO_4 \longrightarrow 2PbHPO_4 + 2H_2O \quad (5)$$
$$\downarrow$$
$$Pb_2P_2O_7 + H_2O$$

$$PbO + 2H_3PO_4 \longrightarrow Pb(H_2PO_4)_2 + H_2O \quad (6)$$
$$\downarrow$$
$$Pb(PO_3)_2 + 2H_2O$$

$$3PbO + 2H_3PO_4 \longrightarrow Pb_3(PO_4)_2 + 3H_2O \quad (7)$$

As described in greater detail below, the precipitation reaction is carried out such that the formation of lead orthophosphate (Equation 7) is minimized.

When the acid radical or anion which is to be removed is in association with an ammonium cation, the precipitation reaction proceeds as illustrated by the following Equations 8–10 in which ammonium chloride and ammonium sulfate typically represent the ammonium salts which are removed from solutions containing the same.

$$PbO + (NH_4)_2SO_4 \rightarrow PbSO_4 + 2NH_3 + H_2O \quad (8)$$

$$2PbO + 2NH_4Cl \rightarrow PbO \cdot PbCl_2 + 2NH_3 + H_2O \quad (9)$$

$$PbCO_3 \cdot Pb(OH)_2 + 2NH_4Cl \rightarrow$$
$$PbO \cdot PbCl_2 + 2NH_3 + CO_2 + 2H_2O \quad (10)$$

As shown by these equations the sulfate and chloride radicals are converted to lead sulfate and lead oxychloride, respectively, and the ammonium cation is converted to and evolved as a valuable recoverable product of the precipitation step, namely, ammonia.

From the standpoint of substantially reducing the concentration in the solution being treated of dissolved cation with which the acid radical is in association, the cation may also be a metal cation whose corresponding oxide or carbonate derivative is substantially water insoluble. Since such precipitated compounds in water give a pH lower than 10.4 which is the pH of lead oxide in water, the reverse reaction does not occur, i.e., the reconversion of the lead salt to the precipitant form. One class of such metal cations are those derived from a heavy metal, i.e., a metal having a density above 4, such as metals of Groups I–B through VII–B and the iron group metals including iron, cobalt and nickel. Such metal cations are converted during the precipitation step to their insoluble oxide or carbonate derivatives depending upon the particular precipitant employed. For example, when the solution treated comprises ferrous chloride or ferrous sulfate the following reactions occur:

$$2PbO + FeCl_2 \rightarrow PbO \cdot PbCl_2 + FeO \quad (11)$$

$$PbO + FeSO_4 \rightarrow PbSO_4 + FeO \quad (12)$$

$$PbCO_3 \cdot Pb(OH)_2 + FeCl_2 \rightarrow$$
$$PbO \cdot PbCl_2 + FeCO_3 + H_2O \quad (13)$$

As illustrated, the acid radical is again converted to the corresponding lead salt precipitate and the heavy metal is removed from solution as a water insoluble oxide which in accordance with Equations 11 and 12 is iron oxide, or as water insoluble carbonate which as illustrated by Equation 13 is iron carbonate.

A second class of metal cations which may be removed from the solution treated as insoluble product are the alkaline earth metal cations including those derived from magnesium, calcium, strontium and barium. In order to effectuate the substantial conversion of alkaline earth metal cations to an insoluble product of the precipitation, they are converted to their corresponding carbonate derivatives. This is accomplished by carrying out the precipitation reaction under sufficient carbon dioxide to form an alkaline earth metal carbonate together with a lead carbonate complex of the lead salt of the acid radical in accordance with the following equations:

$$2PbO + CaCl_2 + 2CO_2 \rightarrow PbCl_2 \cdot PbCO_3 + CaCO_3 \quad (14)$$

$$PbCO_3 \cdot Pb(OH)_2 + MgCl_2 + CO_2 \rightarrow$$
$$PbCl_2 \cdot PbCO_3 + MgCO_3 + H_2O \quad (15)$$

The precipitant is added to the precipitation reaction zone in an amount sufficient to satisfy at least the stoichiometric requirements of the desired precipitation reaction. From the standpoint of forming a lead salt of the acid radical, the precipitant is generally added in an amount sufficient to provide a minimum equivalent ratio of 1:1, defined herein as the number of equivalents of bivalent lead in the precipitant per equivalent of the acid radical considering its basicity as present in the final precipitate. The particular equivalent ratio employed in effecting any particular reaction depends upon several factors such as the nature of the acid radical to be precipitated (e.g., its oxidation state), the solubility of the lead salt which is formed, and the relative ease with which the precipitated lead salt is converted to elemental lead in the subsequent reduction reaction. When the acid radical is one of the aforesaid monovalent anions such as halide, nitrate, carboxylate, etc., the precipitation proceeds with initial formation of the simple lead salt, Pb(acid radical)$_2$, such as lead dichloride as illustrated by the following equations which correspond, respectively, to Equations 1 and 2 above:

$$PbO + 2HCl \rightarrow PbCl_2 + H_2O \quad (16)$$

$$PbCO_3 \cdot Pb(OH)_2 + 4HCl \rightarrow 2PbCl_2 + 3H_2O + CO_2 \quad (17)$$

In accordance with these equations, it is seen that the minimum equivalent ratio is 1:1. Alternatively, the relative amounts of reactants can be expressed as a mole ratio in which case of course the valence of the acid radical must be taken into consideration. For example, when the acid radical is monobasic, the minimum mole ratio is 0.5:1, defined as the number of atoms of lead in the precipitant per mole of monobasic acid radical. However, in order to decrease the solubility in the aqueous solution treated of the lead salts derived from the monovalent radicals, a sufficient excess of the precipitant is employed to form the complex basic or oxysalts such as those having the empirical formula, $nPbO \cdot PbY_2$, in which $n$ usually has a numerical value from 1 to 4 and Y is one of the aforesaid monovalent anions. For example, in order to lower the solubility product of lead dihalide salts, the mole ratio is at least about 1:1 which corresponds to an equivalent ratio of at least 2:1, such that the simple lead halide salt is converted to a less water-soluble form such as a complex thereof with PbO as in the basic lead halide or lead oxyhalide salts having the empirical formula, $nPbO \cdot PbX_2$ wherein X is any of the halogens, and $n$ has a value from about 1 to 4. When $n$ is about 1, the precipitation reaction occurs as illustrated by the above Equations 1, 2, 9–11 and 13. In order to achieve substantially complete removal of dissolved halide ion (or other monovalent radical) from the solution treated and simultaneously clarify the solution of dissolved cation with which the acid radical is originally associated in solution, i.e., reduce the content of the contaminant to a level of about 100 p.p.m. or less, a mole ratio of at least 2:1 is employed in order to form substantial amounts of the less soluble higher complexes such as $2PbO \cdot PbX_2$ and $3PbO \cdot PbX_2$. As the water solubility of the initially formed lead salt increases, the precipitation reaction is carried out employing a sufficient excess of precipitant in order to complex the salt with excess lead oxide to form the corresponding less soluble oxy or basic lead compounds. For example, among the more water-soluble lead salts are those of some monovalent anions such as lead acetate and lead perchlorate and, when the present method is employed to precipitate such anions from aqueous solutions thereof, the precipitant is added to the solution in an amount sufficient to provide a mole ratio of at least 4:1 which corresponds to an equivalent ratio of at least 8:1.

In forming a precipitate comprising lead and a dissolved bivalent anion from solutions containing the same, the precipitant is added to the precipitation reaction zone in an amount at least sufficient to satisfy the minimum stoichiometric requirements to form the simple lead-bivalent anion salt which is 1:1 expressed as either the minimum equivalent ratio or mole ratio, as shown by the above Equations 3, 4, 8 and 12 illustrating removal of sulfate anions. In order to lower the water solubility of the simple salts such as lead sulfate, for example, a mole ratio of at least 1.1:1, expressed as the number of atoms of lead in a precipitant per mole of divalent radical, is employed to favor the formation of complexes having the general formula $xPbO \cdot Pb(divalent\ radical)$ wherein $x$ has a numerical value of from 0.1 to 4, such as in the lead oxysulfates, $\frac{1}{2}PbO \cdot PbSO_4$ and $PbO \cdot PbSO_4$, etc. It is to be understood that when the precipitation reaction is carried out under carbon dioxide, the lead oxide (PbO) in the precipitated complex salts has a tendency to absorb carbon dioxide to become $PbCO_3$ as shown by above Equations 14 and 15.

In precipitating higher valent radicals, the nature of the precipitated lead salt becomes more complex. For example, when the solution treated comprises phosphate anions, a mixture of various lead phosphates is formed as shown by above Equations 5-7. Although any one of the reactions substantially clarifies the water of phosphate, it is preferred to minimize the occurrence of the reaction of Equation 7, that is, the formation of lead ortho-phosphate. This is desirable from the standpoint of subsequent treatment of the precipitated lead phosphate in that lead ortho-phosphate requires substantially higher temperatures for its subsequent conversion in the reduction step to elemental lead as compared with the temperatures required to reduce the lead pyro- and meta-phosphates. Accordingly, in order to minimize lead orthophosphate formation, the mole ratio of reactants, expressed as the number of moles of lead oxide (PbO) per mole of phosphoric acid ($H_3PO_4$) in the solution treated, is maintained less than about 3:2 which is the stoichiometric ratio required for formation of orthophosphate. Preferably the mole ratio is about 1:1 with a mole ratio of less than 1:1 being particularly preferred in order to favor the formation of the lead pyro- and meta-phosphates as the respective predominant precipitated salt.

When the primary objective of the precipitation reaction is to produce non polluted water, it is important to have present in the reaction zone a sufficient excess of precipitant and, for this purpose, the precipitant is added in about a 10 percent molar excess above the aforesaid indicated minimum mole ratios, although a greater excess may be employed without departing from the scope of this invention. From the standpoint of practical considerations and subsequent handling of the solids phase separated from the aqueous medium, a 100 percent molar excess is usually avoided.

The origin of the ions removed by the method of this invention is not critical to operability and may be a variety of waste or by-product liquors and contaminated aqueous media. Examples of such liquors which are treated by the method of this invention include: steel pickling liquors comprising sulfuric acid and hydrochloric acid; ammonium chloride liquor produced during the Solvay process; liquors obtained by extraction with acidic media of ores such as ilmenite ore and phosphate-bearing rock; run off waters from mines containing iron sulfide or other pyrites, sulfide undergoing bacterial and/or chemical oxidation to form sulfate contaminant; industrial by-product and other waste streams comprising phenol, phosphate-containing detergents, sulfonated detergents and solutions containing calcium chloride produced as a by-product in the chlorohydrin method for manufacturing propylene oxide; pulping liquors comprising sulfites or chlorides; and waterways containing a relatively high concentration of phosphate and nitrates. The applicability of the present invention is not limited to treatment of available waste or by-product solutions but is also applicable to treatment of prepared solutions of any compounds containing one of the aforesaid cations and acid radicals to convert at least a portion of the compound to a more valuable product. For example, the combination of process steps described herein may be used for the production of pure phosphorus from wet process phosphoric acid.

It is to be understood that any combination of the above described reactions may be effected during the precipitation reaction without departing from the scope of this invention. For example, steel pickling liquors usually contain a ferrous salt corresponding to the mineral acid employed and thus when a spent sulfuric acid pickling liquor is treated by the method of this invention, the reactions of Equations 3 and 12, for example, occur simultaneously to provide water substantially free of dissolved sulfuric acid and ferrous sulfate. It is to be further understood that in addition to hydrogn, ammonium, heavy metal and alkaline earth metal cations, the solution treated may also contain other cations such as those derived from the alkali metals including sodium, potassium and lithium without departing from the scope of this invention. Since oxides and carbonates of the alkali metals are water soluble and yield aqueous solutions having a pH above 10.4, which is the pH of aqueous media containing PbO, alkali metal cations are not precipitated from solutions containing the same in view of the following reversible reaction which occurs:

$$PbO \cdot PbCl_2 + 2MOH \rightleftharpoons 2PbO + 2MCl + H_2O \quad (18)$$

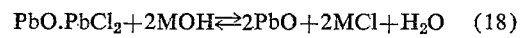

wherein M is an alkali metal. However, the presence of alkali metal cations in the solution treated does not interfere with the desired precipitation reaction. To the contrary, it has been found that since the pH of the aqueous solution treated with the precipitant is increased by the addition thereto of salts derived from a strong base such as alkali metal salts or alkaline earth metal salts, a beneficial effect is realized particularly when the dissolved salt to be removed is an ammonium salt. In accordance with a more specific embodiment of this invention particularly as it relates to treatment of ammonium salt solutions, such solutions are preferably treated with the precipitant in the presence of alkali metal and alkaline earth metal salts such as the halides, and chlorides in particular. Depending upon the source, the ammonium salt solution may already contain salts which enhance the pH of the solution such as by-product liquor produced in the Solvay process which in addition to ammonium chloride also contains sodium chloride. When the precipitation reaction is effected in the presence of alkali metal salts, the rate of removal of ammonia from the aqueous solution in accordance with the reactions of Equations 8-10 above, is substantially enhanced and a more complete removal of ammonia is realized.

The precipitation reaction may be carried out in a batchwise or continuous manner employing countercurrent, concurrent or staged contact of reactants. The precipitate comprising lead and the acid radical is readily separated from the aqueous percipitation reaction medium such as by filtration, centrifuging, settling or other liquid-solids separation techniques. The remaining clarified aqueous medium or any portion thereof may be recycled as necessary or desired to the precipitation reaction zone in order to reduce further the content of any remaining dissolved contaminant until the content has been lowered to the tolerance level for ultimate disposal into waterways.

The solid phase recovered from the precipitation reaction medium comprising precipitated lead salt, any excess unreacted precipitant and miscellaneous solid compounds formed during the precipitation reaction such as heavy metal oxides and carbonates and alkaline earth metal carbonates, is then usually at least partially dried such as by heating at a temperature of from about 100 to about 400° C. The solid material is then passed to a reduction zone wherein it is treated with a reducing environment to convert combined lead value to elemental lead and to provide a second valuable product corresponding to at least a portion of the acid radical originally precipitated. The reduction is carried out in the presence of hydrogen, carbon monoxide, natural gas, hydrocarbons, and tar, including various admixtures thereof with one another or with normally gaseous materials such as carbon dioxide, nitrogen, and air for partial combustion. Reducing gas for the reduction can be produced in any suitable manner, such as by steam reforming and partial oxidation of suitable hydrocarbon feed stocks such as natural gas and normally liquid hydrocarbon fractions such as selected naphtha fractions.

The temperature at which the reduction is carried out ranges between about 500° C. and about 1000° C., the particular temperature employed depending upon the nature of the particular lead salt formed in the precipitation step. For example, in the reduction of lead salts comprising halide such as lead oxyhalide, the temperature is usually maintianed between about 600° C. and about 900° C., the reaction yielding elemental lead and hydrogen halide which is recoverable as a product of the process, in accordance with the following equations which illustrate, respectively, the use of hydrogen and hydrogen-carbon monoxide as the reducing gas.

$$PbO \cdot PbCl_2 + H_2 \rightarrow 2Pb + 2HCl + H_2O \qquad (19)$$

$$2PbO \cdot PbCl_2 + 3H_2 + CO \rightarrow 4Pb + 4HCl + H_2O + CO_2 \quad (20)$$

For the reduction of the lead sulfate salts, the temperature is maintained between about 700° C. and about 1000° C. such that the following overall reaction providing sulfur dioxide occurs:

$$PbSO_4 + 2H_2 \rightarrow Pb + SO_2 + 2H_2O \qquad (21)$$

The reduction of precipitated lead phosphates occurs with formation of elemental phosphorus as well as lead, and is preferably conducted at at emperature between about 700° C. and about 1000° C. For example, in reducing lead pyrophosphate with hydrogen, the reaction proceeds as follows:

$$2Pb_2P_2O_7 + 14H_2 \rightarrow 4Pb + P_4 + 14H_2O \qquad (22)$$

and when carbon monoxide is present, the reduction reaction proceeds as follows:

$$2Pb_2P_2O_7 + 14CO \rightarrow 4Pb + P_4 + 14CO_2 \qquad (23)$$

Phosphorus is also produced by reduction of the lead meta- and ortho-phosphates, although as already described the precipitation reaction is carried out so as to minimize the formation of lead orthophosphate since it requires temperatures of at least 1100° C. for reduction to elemental lead.

As previously described, when the solution passed to the precipitation zone also contains heavy metal or alkaline earth metal cations, such are converted to their corresponding oxides or carbonates as illustrated by the above Equations 11–15. When such oxides, carbonates or other miscellaneous solids are produced during the precipitation reaction they are usually introduced to the reduction zone as part of the solid phase recovered from the precipitation reaction medium. Any such solid compounds which remain as such or are converted to another solid compound, are readily separated from the molten medium comprising lead simply by withdrawal of a solids-rich stream from the molten medium comprising elemental lead. Minor amounts of such solids or other molten metals which may become entrained in the molten lead need not be removed since they do not interfere with the subsequent stages of the process.

Product comprising elemental lead produced in the reduction zone is removed therefrom and passed to a regeneration zone in which the elemental lead is converted to the precipitant form, namely, lead oxide, basic lead carbonate or mixtures thereof, which is then recycled to the precipitation zone. The regeneration of the lead oxide precipitant is carried out by reacting the lead with an oxygen-containing gas such as air at a temperature between about 600 and 925° C. such that the lead is converted to an oxidized form consisting essentially of lead monoxide. When basic lead carbonate is the desired form of the precipitant it is regenerated by carbonation of the regenerated lead monoxide in the presence of water or in dry stage at temperatures below 300° C.

The following examples are offered as a better understanding of the present invention and are not to be construed as unnecessarily limiting to the scope thereof.

EXAMPLE I

In accordance with this example a specific embodiment is described illustrating the application of the method of this invention to the removal of phosphate as the acid radical from an aqueous solution thereof and to the production of elemental phosphorous from the phosphate radical. For this purpose, reference is now had to FIG. 1 of the accompanying drawings which includes the three principal reaction zones of the method of this invention, namely, lead phosphate preparation zone 40, reduction zone 60 and lead oxide preparation or regeneration zone 65. For the purpose of this example, the source of the phosphate-containing aqueous medium which is passed to zone 40 is tricalcium phosphate rock ore containing 31 percent $P_2O_5$. The ore is introduced in line 8 into phosphate ore preparation zone 10 in which the ore is subjected to grinding to obtain comminuted material which passes 70 percent through a 200 mesh screen. The comminuted ore is passed from zone 10 via line 12 into phosphoric acid preparation zone 30 in which the digestion of phosphate rock is accomplished by acidulation with relatively dilute sulfuric acid produced in zone 20, most preferably having a concentration between about 10 and about 40 percent $H_2SO_4$ on a weight basis, to achieve a high percentage recovery of phosphate values from the ore while providing readily filterable crystals of calcium sulfate. Although for the purpose of this example the phosphate rock is digested with a dilute aqueous solution of sulfuric acid, it is to be understood that the phosphate rock ore may be acidulated with any of the other strong mineral acids including hydrochloric, nitric and hydrofluoric acids without departing from the scope of this invention.

Referring to catalytic sulfuric acid production zone 20, a 20 percent solution of sulfuric acid is produced from starting materials which comprise air introduced in line 21, water introduced in line 22 and sulfur dioxide introduced in line 23. The sulfur dioxide is produced in an auxiliary unit (not shown in FIG. 1) in which sulfur is melted and pumped into a combustion chamber in which it is burned with excess air. The flue gas which is produced containing $SO_2$ is cooled and scrubbed with dilute sulfuric acid in an absorption tower to transfer sulfur dioxide into the acid phase. Acid rich in sulfur dioxide is passed in line 23 into contact with an oxygen-containing gas and water in zone 20 to produce sulfuric acid by the following reaction:

$$SO_2 + \tfrac{1}{2}O_2 + H_2O \rightarrow H_2SO_4 \qquad (24)$$

This reaction is catalyzed by $Mn^{++}$ ion and Alkanol B at concentrations of 0.03 percent and 0.0001 percent, respectively, which are injected into zone 20. The heat liberated in the reaction is removed by a liquid cooler and make-up water is added as required. Gaseous material is vented in line 24. Product acid containing about 20 percent $H_2SO_4$ is passed at a temperature of about 135° F. in line 25 for introduction into phosphoric acid preparation zone 30.

In phosphoric acid preparation zone 30, the phosphorous values are extracted from the comminuted ore to form an aqueous solution of phosphoric acid and gypsum in accordance with the following reaction:

$$Ca_3(PO_4)_2 + 3H_2SO_4 \rightarrow 2H_3PO_4 + 3CaSO_4 \qquad (25)$$

In this example, the recovery of phosphorus values from the ore achieved in zone 30 is about 94 percent. Gypsum, gangue, and unreacted rock are separated by suitable filtration means from the phosphoric acid passed to waste in line 34. Process water is provided in line 32 to wash the gypsum, etc., collected on the filter. A filtered solution of phosphoric acid containing about 7.6 percent $P_2O_5$ is withdrawn from zone 30 and passed via conduit 38 into lead phosphate preparation zone 40. Gases produced by extraneous reactions in zone 30, e.g., $CO_2$ and $SiF_4$, are collected by exhaust fans, scrubbed with water to remove fluorine compounds and vented to a stack via line 31.

Referring to lead phosphate preparation zone 40, the dilute phosphoric acid introduced in line 38 is brought into contact with lead oxide (PbO), which is present in about a 5 percent excess, to produce a mixture of di-ortho and mono-orthophosphates in aqueous solution. Upon losing water these orthophosphates form pyro- and meta-phosphates and, thus, the reactions occurring in zone 40 are as illustrated by the above Equations 5 and 6. In order to minimize lead orthophosphate precipitation, i.e., the reaction of Equation 7, the reaction in zone 40 is preferably carried out employing countercurrent flow or staged contact of reactants; and the mole ratio of PbO to $H_3PO_4$ is maintained less than about 3:2, which is the stoichiometric ratio required for formation of orthophosphate. As already stated, the preferred mole ratio is about 1:1 in accordance with the stoichiometric requirements of pyrophosphate formation, and is most preferably less than 1:1 in accordance with the stoichiometric requirements for formation of lead metaphosphate which is the most readily reducible form. It is important, however, to maintain a sufficient concentration of lead oxide to prevent loss of phosphorus values through failure to precipitate the $(PO_4)\equiv$ ion from acid solution. The resulting slurry of lead phosphate material and unreacted lead oxide is filtered to obtain a cake containing about 10 percent water. The filter cake is dried, e.g., in a rotary dryer using hot flue gas introduced from reduction zone 60 via line 69. Solid material which may be carried out of the dryer in the flue gas can be recovered, e.g., in a scrubbing tower and returned for filtration. The dried lead phosphate material is conveyed in line 46 to reduction zone 60, and water essentially free of phosphate is recovered from zone 40 via line 43.

Dried lead pyrophosphate is passed in line 46 into reduction zone 60 for direct reduction with hydrogen gas of about 89 percent purity introduced in line 56 to produce elemental phosphorus at a temperature of about 1650° F. The reaction can be carried out in a furnace in which the molten lead, molten lead phosphate material, and the reducing gas are intimately mixed within the tubes. Heat for the reaction is supplied by indirect heat exchange through the tube walls with flue gas produced from the combustion of natural gas or by partial combustion of natural gas within the reactor. The hot flue gas employed in heating the reduction zone can be withdrawn and employed, for example, to generate steam and then to dry the pyrophosphate in zone 40, as previously described.

Reducing gas for the direct reduction in zone 60 can be produced in any suitable manner, such as by steam reforming and partial oxidation of suitable hydrocarbon feed stocks, such as selected naphthas and natural gas. In FIG. 1, hydrogen for the reduction is produced by steam reforming of natural gas in a conventional reforming zone which has been adapted to handle a large hydrogen recycle stream 55 obtained from reduction zone 60. Natural gas feed is introduced to hydrogen production zone 50 in line 54 and mixed with recycle gas from line 55 following suitable treatment such as, for example, passage through a catalyst guard chamber designed to remove sulfur present in the natural gas and phosphorus vapor from the reduction furnace. The hydrocarbon mixture is admixed with steam introduced in line 52 and reformed catalytically in a single stage at about 1550° F. and about 460 p.s.i.a. to produce a synthesis gas containing about 5.8 percent methane. After cooling to about 700° F., carbon monoxide is shifted to carbon dioxide, which is then removed by absorption in monoethanolamine and ultimately withdrawn by means of line 53. Purified gas which contains about 89 percent $H_2$ is then heated to about 750° F., expanded to 40 p.s.i.a., heated to about 1400° F. against reformer effluent gas, and then passed to zone 60 in line 56 to effect the reduction of the pyrophosphate.

Elemental phosphorus produced in reduction zone 60 is removed from the reactor tubes in effluent gas containing about 4.4 percent phosphorus. In order to recover the phosphorus for storage or shipment, the effluent can be cooled to 800° F., for example, passed through electrostatic precipitators to remove entrained dust and melt, and quenched with water to a temperature of about 100° F. to produce the molten phosphorus removed in line 70. Molten phosphorus can then be separated from the solid lead particles and recycle water in a phosphorus sump and stored under water at 140° F. in suitable storage tanks. The phosphorus can be transferred from the storage tanks into suitable shipping cars or containers for passage to the point of use or, if desired, can be converted to phosphoric acid at the plant site in accordance with conventional methods. Elemental lead produced in the reduction zone gravitates to the bottom of the reduction zone where it is withdrawn for recycling via line 61 to lead oxide preparation zone 65.

The lead oxide required for the reaction in zone 40 is prepared by passing molten lead at 1650° F. from reduction zone 60 via line 61 through valve 62 into lead oxide preparation zone 65 and burning the lead with about 20 percent excess air introduced in line 66. The lead oxide is passed into zone 40 via line 67 wherein it is quench-cooled to about 600° F. with process water introduced in line 41 to avoid the formation of red lead oxide ($Pb_3O_4$). Lead is added to the system as required to make up for losses, e.g., in line 42 as shown or directly to lead oxide preparation zone 65.

The table of data presented below provides a numerical example of the flow quantities employed in one example of operation in accordance with the embodiment of the process described wtih reference to FIG. 1.

TABLE I

| Ref. No. | Description | Flow rate, lbs./hr. | Temp., °F. | Pres., p.s.i.a. | Conc. |
|---|---|---|---|---|---|
| 25 | Sulfuric acid | 225,000 | 135 | | 20% $H_2SO_4$ |
| 8 | Phosphate rock | 65,000 | | | 31% $P_2O_5$ |
| 38 | Phosphoric acid | 252,000 | 170 | | 7.6% $P_2O_5$ |
| 61 | Molten lead | 59,890 | 1650 | | |
| 46 | $Pb_2P_2O_7$ | 83,500 | 260 | | |
| 69 | Flue gas | [1] 1,660 | 1280 | | |
| 56 | Reducing gas | 5,280 | 1400 | 35 | 88.8 mol percent $H_2$ |
| 70 | Molten phosphorus | 8,325 | 140 | | |

[1] Mol/hr.

During laboratory investigation in which mixtures containing lead pyrophosphate were reduced with gaseous reducing material such as hydrogen, for example, while the lead pyrophosphate was maintained as a first molten layer superimposed upon a second more dense layer of molten elemental lead, a significant increase in specific reaction rate was observed when agitation in the region of the interface between the layers caused intermixing of the lead and the lead pyrophosphate. It is hypothesized that lead might react with lead pyrophosphate to split out lead oxide and phosphorus. Hydrogen then reduces the lead oxide to obtain water and elemental lead. According to the theory, the molten lead effectively catalyzes the production of phosphorus.

By applying the present process to convert phosphate values to elemental phosphorus several advantages over prior art methods are realized. For example, there are two principal commercial processes for effecting the recovery of phosphorus values from the insoluble phosphate ore in which it is found naturally occurring. In accordance with one method, known as the electric furnace process, insoluble phosphates are reduced with carbon in an electric furnace at an elevated temperature to produce relatively pure elemental phosphorus which can then be burned and hydrated to produce phosphoric acid, if desired. Unfortunately, in the electric furnace process, phosphorus production is relatively expensive, plant investment is relatively high because of the high temperatures required for the reduction, and operating costs are high because of the large quantity of electric power which is consumed. In accordance with the other principal method, known as the wet process, phosphate rock is digested with sulfuric acid to produce phosphoric acid and insoluble material which is removed by filtration. It is not possible to recover elemental phosphorus by the wet process and the phosphoric acid which is produced contains many of the impurities contained in the original ore. The disadvantage of the wet process is that the product acid is relatively impure and water must be evaporated from a corrosive material where concentrated acid is desired. On the other hand, the method of the present invention overcomes and eliminates the deficiencies inherent in the prior art methods and provides a novel process whereby phosphorus and high quality phosphoric acid can be produced in an economically attractive manner. In addition to providing an improved method for the production of phosphorus from phosphate value derived from phosphate rock, the process of this invention is also applicable to the removal from other aqueous media of phosphate such as waste detergent liquors and not only purifies the liquor of the phosphate contaminant but also allows for the conversion of the phosphate contaminant to the valuable product, phosphorus.

EXAMPLE II

In accordance with this example which is described with reference to FIG. 2 of the accompanying drawings, a specific embodiment is illustrated of the application of the method of this invention to the removal of sulfate radicals from an aqueous solution thereof and recovery of sulfur value as sulfur dioxide. The aqueous medium which is treated is derived from ore extraction zone 100 in which sulfuric acid introduced via line 102 is used to extract titania from ilmenite ore introduced by means of line 101. The extraction procedure removes titania from the ore which also contains iron compounds and other miscellaneous compounds, and the solution gradually becomes more concentrated in various metal salts such as in particular ferrous sulfate. Titania rich solids are withdrawn from zone 100 by means of line 104 and the spent sulfuric acid liquor containing 19.6 weight percent $H_2SO_4$ is passed to lead sulfate preparation zone 110 by means of line 103 at a rate of 4202.8 pound-moles per hour, the rate of flow of the individual components on a pound-mole per hour basis being: 198.2 sulfuric acid, 3963.3 water, 31.9 ferrous sulfate, 7.7 titanium sulfate, 1.7 miscellaneous sulfates and oxides such as magnesium and aluminum sulfates, chromium and vanadium oxides and soluble titania. Lead oxide (PbO) precipitant is fed to reaction zone 110 by means of line 111 at a rate of 382.4 pound-moles per hour, the mole ratio of PbO to dissolved sulfate radical being approximately 1.5:1.0. Preferably the precipitant and aqueous medium are contacted with countercurrent flow through the reaction zone. The aqueous reaction mixture in zone 110 is maintained at a temperature of about 190° F. and the solids in the aqueous reaction slurry are maintained in suspension by agitation, the total residence time in the reaction zone being 30 minutes. It is to be understood that zone 110 may comprise one or more reactors such as three reactors, with introduction of the spent sulfuric acid liquor and precipitant to the first and passage of the slurry in series through the remaining reactors. Aqueous effluent from reaction zone 110 is withdrawn therefrom by means of line 112 and is passed to separation zone 120 at a rate of 4585.1 pound-moles per hour, the flow rate of the individual components on a pound-mole per hour basis being: 4161.5 water, 127.5 lead oxide, 254.9 lead sulfate, 31.8 iron oxide (expressed as FeO), 7.7 titanium oxide (expressed as $Ti_2O_3$), and 1.7 miscellaneous oxides. In zone 120, the precipitated lead sulfate salt and metal oxides formed in reaction zone 110, and excess lead oxide are separated from the aqueous slurry by any suitable means such as centrifuging or filtering. Clarified water containing less than 1000 parts per million of sulfate and less than 2 parts per million of lead is withdrawn from separation zone 120 by means of line 121. The wet solids containing approximately 15 weight percent water are withdrawn from separation zone 120 and passed to drying zone 130 by means of line 122. Drying zone 130 comprises an oil-fired, rotary drier and drying is effected by passing the hot combustion gases in parallel flow over the wet solids. Exhaust gases at about 300° F. are vented from the drying zone by means of line 132 employing cyclones to recover any entrained solids from the exit gas. The dried solids consisting essentially of lead oxide and lead sulfate, expressed as ½ $PbO \cdot PbSO_4$, iron oxide, expressed as FeO, and other impurities as metal oxides are withdrawn from zone 130 and are passed to reduction zone 140 by means of line 131. A hydrogen-rich gas generated in hydrogen production zone 150 comprising a methane-steam reformer to which the feed is fed via lines 151 and 152, and a water gas shift converted as described above with reference to zone 50 of FIG. 1, is fed to reduction zone 140 by means of line 153. Make-up lead is added to the reduction zone by means of line 143. The reduction is carried out at 1750° F., the heat necessary to maintain this reaction temperature being supplied indirectly by an oil burner or by partial combustion of the reducing gas. As the lead compounds are reduced, molten lead which forms is passed such as by gravity flow from the reduction zone by means of line 141 to regeneration zone 160. Iron oxide and other impurities contained in the solids passed to zone 140 is readily withdrawn from the reduction zone as a solids rich stream from the upper portion of the molten lead by means of line 142. Gaseous effluent containing sulfur dioxide and hydrogen sulfide is withdrawn from the reduction zone by means of line 144 having valve 145 thereon. The sulfur values in the effluent may be recovered as such by means of line 146 having valve 147 thereon, or it may be passed to sulfuric acid preparation zone 180 wherein it is converted to sulfuric acid by any conventional method such as that described above in connection with zone 20 of FIG. 1, recycling the sulfuric acid by means of line 181 to extraction zone 100.

As noted above, the molten lead formed in reduction zone 140 is passed to regeneration zone 160 by means of line 141. In zone 160 the elemental lead is re-oxidized to lead oxide precipitant such as by atomization in a lead burner with air introduced by means of line 163, at a temperature of about 1250° F. The gas velocity of the air is maintained sufficiently high such as 150 feet per second or more to maintain the product lead oxide (PbO) in the fluidized state, and the hot fluidized stream is passed from zone 160 by means of line 161 to cooling zone 170. In the latter zone which may comprise a waste heat boiler, the fluidized stream is cooled to about 200° F. and passed through bag filters to remove the lead oxide which may then be conveyed to precipitation reaction zone 110 by means of line 171. Exhaust gas comprising nitrogen and carbon dioxide is discharged from zone 170 to the atmosphere by means of line 172.

It is to be understood that the above Examples I and II may be conducted under the indicated conditions employing basic lead carbonate as precipitant in place of lead oxide. When the basic lead carbonate is employed, carbon dioxide generated in zone 40 of FIG. 1 or in zone 110 of FIG. 2, may be recycled to regeneration zones 65 and 160, respectively, or to the precipitation zone for further utilization in the respective formation of lead phosphate and lead sulfate.

EXAMPLE III

To a 500 ml. capacity reaction vessel fitted with a stirrer, thermometer and distillation column packed with stainless steel rings, there were added 120 ml. of an aqueous solution containing 0.3 mole of ammonium chloride (2.5 molar) and 0.1392 mole of sodium chloride (1.16 molar); 100 ml. of water; and 66.5 grams (0.0859 mole) of reagent grade basic lead carbonate, $2PbCO_3 \cdot Pb(OH)_2$, corresponding to 0.2577 mole of divalent lead. The temperature of the reaction mixture was raised to 102° C. over a period of one hour and 15 minutes, the temperature of the distillation head reaching 68° C. It was observed that distillation began after 30 minutes of this period when the distillation head reached 30° C. and, after an additional 15 minutes (45 minutes into the run), another 65 ml. of water was added to the reaction vessel in order to aid the dissolution of crystalline material (presumably ammonium carbonate) from the distillation head. After this initial one hour and 15 minute period, the run was continued for an additional 5½ hours with stirring during which time the effluent from the reaction vessel passed through the distillation column, a Dean-Stark trap and into a scrubber in which the effluent was passed into water and the solution titrated with 18.06 normal sulfuric acid solution to determine the ammonia content of the reactor effluent. Vaporous effluent from the scrubber was passed in series through two traps each containing water and an indicator (brom cresol green) to check the efficiency of the scrubber. The temperature of the reaction mixture and of the distillation head and the millimoles of ammonia found in the effluent after the indicated period of time are given in the following Table II.

TABLE II

| Time into run | | Temperature of reaction mixture (° C.) | Temperature of distillation head (° C.) | Ammonia evolved (millimoles) |
|---|---|---|---|---|
| Hours | Minutes | | | |
| 1 | 20 | 102 | 98 | 36.12 |
| 1 | 45 | 102 | 99 | 72.24 |
| 2 | | 102 | 98 | 108.36 |
| 2 | 15 | 102 | 99 | 144.48 |
| 2 | 1 30 | 102 | 99 | 180.60 |
| 2 | 45 | 101 | 98 | 189.63 |
| 3 | | 102 | 99 | 198.66 |
| 3 | 15 | 102 | 99 | 207.69 |
| 3 | 30 | 102 | 99 | 216.72 |
| 3 | 45 | 102 | 99 | 225.75 |
| 4 | | 101 | 99 | 234.78 |
| 4 | 1 15 | 101 | 99 | 243.81 |
| 4 | 30 | 101 | 99 | 243.81 |
| 4 | 45 | 103 | 99 | 252.84 |
| 5 | | 103 | 100 | 252.84 |
| 5 | 15 | 103 | 100 | 261.87 |
| 5 | 30 | 102 | 99 | 270.90 |
| 5 | 1 45 | 102 | 99 | 270.90 |
| 6 | | 101 | 57 | 270.90 |
| 6 | 15 | 101 | 99 | 279.93 |
| 6 | 30 | 102 | 99 | 279.93 |
| 6 | 45 | 102 | 99 | 279.93 |

[1] An additional 100 ml. of water was added to the reaction mixture.

At the end of the above distillation, the reaction mixture was cooled, filtered to separate the precipitate which formed during the reaction, and the precipitate was washed with 200 ml. of water to remove sodium chloride and then dried in a vacuum oven. The precipitate weighed 70 grams and, on the basis of the divalent lead content of the initial reaction mixture, the calculated lead content of the precipitate is about 3.68 millimoles per gram. The precipitate and filtrate including the water wash were each analyzed for chlorine content using a standard silver nitrate-sodium thiocyanide analytical test. As a result of these analyses, it was found that the precipitate contained 237.30 millimoles of chloride and the total filtrate contained 180.0 millimoles of chloride for a total recovery of chloride of 417.30 millimoles or about 95 percent of the total chloride contained in the initial reaction mixture. The yield of chloride value removed from the initial solution as precipitated lead oxychloride salt is about 79 percent, based on the total chloride value (300 millimoles) derived from the ammonium chloride contained in the initial solution. From the above Table II it is seen that a total of 279.93 millimoles of ammonia was evolved from the initial reaction mixture which contained an equivalent of 300 millimoles of ammonia and thus, as a result of this run, about 93 percent of the ammonia value of the starting material was removed therefrom and recovered.

An aliquot of the above formed lead oxychloride precipitate, was reduced with hydrogen in a reactor having a corrosion resistant alumina liner. The hydrogen feed was metered prior to being fed to the reactor. Vaporous effluent containing hydrogen chloride and water evolved during the reduction reaction and unreacted hydrogen was passed through a first trap in which the hydrogen chloride was measured during the course of the reduction by titration with a 1.01 normal solution of sodium hydroxide. The effluent was then allowed to pass into a second trap and any remaining hydrogen chloride content thereof was determined at the end of the reaction by titration with a 1.01 normal sodium hydroxide solution. The remaining effluent containing unreacted hydrogen was passed through a second meter and then recycled to the reactor. Following this procedure a 30 gram aliquot of the above-formed precipitate which contained 3.390 millimoles of chloride per gram for a total of 101.7 millimoles in the portion reduced, was charged to the reactor, the system flushed with nitrogen and the temperature of the reactor raised to 700° C. After standardizing the inlet and outlet wet test meters, the reduction was conducted under the conditions given in the following Table III, the millimoles of hydrogen chloride collected in the first trap also being given.

TABLE III

| Time into run (minutes) | Temperature (° C.) | HCl (millimoles) | Hydrogen (liters) | |
|---|---|---|---|---|
| | | | In | Out |
| 0 | 700 | | 0.0 | 0.0 |
| 10 | 710 | | 7.90 | 6.45 |
| 20 | 720 | 30.30 | 14.40 | 12.58 |
| 30 | 720 | 40.40 | 21.10 | 19.25 |
| 40 | 710 | 45.45 | 29.80 | 28.05 |
| 50 | 700 | 54.54 | 36.00 | 34.35 |
| 60 | 700 | 54.54 | 44.10 | 42.50 |
| 70 | 710 | 54.54 | 50.80 | 49.20 |
| 80 | 710 | 54.54 | 58.00 | 56.34 |
| | | 60.60 | | |

At the end of the reduction reaction, the liquid collected in the second trap was titrated and found to contain an additional 8.08 millimoles of hydrogen chloride which together with the above-indicated 60.60 millimoles of hydrogen chloride collected in the first trap represents a total of 68.68 millimoles of hydrogen chloride evolved and collected during the reduction. Since the aliquot of precipitate which was reduced contained a total of 101.7 millimoles of chloride, the yield of chloride recovered from the precipitate as hydrogen chloride is 67.6 percent. The weight of solid recovered after the reduction was 21.9 grams for a recovery of about 95.9 percent lead, based on the calculated divalent lead content (110.4 millimoles or 22.8 grams) of the 30 gram aliquot of precipitate which was reduced.

EXAMPLE IV

To a two-liter capacity reaction vessel fitted with a stirrer, thermometer and distillation column packed with stainless steel rings there were added one liter of an aqueous solution containing 2.82 moles of ammonium chloride; 669 grams (3.0 moles) of lead oxide; 150 grams (2.56 moles) of sodium chloride; and 200 ml. of water. The temperature of the reaction mixture was raised to 90° C. over a period of one-half hour, and when the temperature of the distillation head reached 30° C. it was observed that the distillation had started. The reaction mixture was stirred moderately for an additional 6½ hours during which time the effluent from the reaction vessel passed from the distillation column into a Dean-Stark trap, a scrubber through which water was circulated and in which the effluent was titrated with an 18.06 normal solution of sulfuric acid to determine the amount of ammonia evolved during the reaction. The effluent from the scrubber was then passed in series through two traps to collect remaining ammonia. The temperature of the reaction mixture and of the distillation head and the amount of ammonia collected during the course of the reaction are given in the following Table IV.

TABLE IV

| Time into run | | Temperature of reaction mixture (° C.) | Temperature of distillation head (° C.) | Ammonia evolved (millimoles) |
|---|---|---|---|---|
| Hours | Minutes | | | |
|  | 45 | 92 | 76 | 505.68 |
| 1 |  | 94 | 78 | 866.88 |
| 1 | 15 | 96 | 82 | 1191.96 |
| 1 | 30 | 97 | 83 | 1444.80 |
| 1 | 45 | 98 | 85 | 1661.52 |
| 2 |  | 99 | 87 | 1842.12 |
| 2 | 15 | 100 | 86 | 1986.60 |
| 2 | 30 | 100 | 90 | 2113.02 |
| 2 | 45 | 101 | 93 | 2239.44 |
| 3 |  | 102 | 94 | 2347.80 |
| 3 | 15 | 102 | 95 | 2438.10 |
| 3 | 30 | 102 | 96 | 2510.34 |
| 3 | 45 | 103 | 97 | 2564.52 |
| 4 |  | 103 | 98 | 2600.64 |
| 4 | 15 | 103 | 98 | 2636.76 |
| 4 | 30 | 103 | 98 | 2672.88 |
| 5 |  | 103 | 98 | 2709.00 |
| 5 | 30 | 104 | 98 | 2727.06 |
| 6 |  | 104 | 99 | 2745.12 |
| 6 | 30 | 105 | 99 | 2763.18 |
| 7 |  | 105 | 99 | 2763.18 |

At the end of the distillation, the reaction mixture was cooled and filtered to separate the precipitate which formed during the reaction. As is evident from the above tabulated data, a total of 2763.18 millimoles of ammonia were evolved and collected during the course of this reaction and, since the solution treated contained 2820 millimoles of ammonium chloride, the yield of ammonia recovered is 97.9 percent.

Upon analysis, the above formed lead oxychloride precipitate was found to contain 0.784 gram (3.78 millimoles) of lead per gram and 3.62 millimoles of chloride per gram. An aliquot of the precipitate was reduced with hydrogen in a reactor having a corrosion resistant alumina liner. The hydrogen feed was metered prior to being fed to the reactor. Vaporous effluent evolved from the reactor during the reduction reaction was passed through a first trap in which the hydrogen chloride content was measured during the course of the reduction by titration with a 1.096 normal solution of sodium hydroxide. The effluent was then allowed to pass into a second trap and any remaining hydrogen chloride content thereof was determined at the end of the reaction by titration with the said sodium hydroxide solution. The remaining effluent containing unreacted hydrogen was passed through a second meter and then recycled to the reactor. Following this procedure, a 50 gram aliquot of the above formed precipitate was charged to the reactor, the system flushed with nitrogen and the temperature of the reactor raised to 690° C. After standardizing the inlet and outlet wet test meters, the reduction was conducted under the conditions given in the following Table V, the millimoles of hydrogen chloride collected in the first trap also being given.

TABLE V

| Time into run (minutes) | Temperature (°C.) | HCL (millimoles) | Hydrogen (liters) | |
|---|---|---|---|---|
| | | | In | Out |
| 10 | 700 | 6.58 | 10.40 | 7.90 |
| 20 | 710 | 70.14 | 20.20 | 17.00 |
| 30 | 710 | 122.8 | 28.40 | 24.60 |
| 40 | 710 | 155.6 | 40.20 | 26.20 |
| 50 | 720 | 155.6 | 50.00 | 46.10 |
| 60 | 720 | 162.2 | 60.00 | 55.90 |
| 70 | 710 | 162.2 | 70.50 | 66.20 |
| 80 | 710 | 162.2 | 81.00 | 76.52 |
| 90 | 710 | 162.2 | 90.00 | 85.10 |
| | | 163.3 | | |

At the end of the reaction, the liquid in the second trap was titrated and found to contain an additional 6 millimoles of hydrogen chloride which together with the above-indicated 163.3 millimoles of hydrogen chloride collected in the first trap constitutes a total of 169.3 millimoles of hydrogen chloride evolved during the reduction. Since the 50 gram aliquot of precipitate which was reduced contained 181.0 millimoles of chloride, the yield of chloride recovered as hydrogen chloride from the precipitate was 93.6 percent. The total weight of lead in the residue remaining after the reduction was 39 grams and, since the 50 gram aliquot of precipitate contained 39.2 grams of combined lead, the conversion to elemental lead was about 99.5 percent.

EXAMPLE V

To a two-liter capacity reaction vessel fitted with a stirrer, thermometer and distillation column packed with stainless steel rings, there were added one liter of an aqueous solution containing 2.82 moles of ammonium chloride, and 669 grams (3.0 moles) of lead oxide. The temperature of the reaction mixture was then raised and, during the course of the reaction, the mixture was stirred and effluent from the reaction vessel was passed through a Dean-Stark trap, a water scrubber in which the effluent was titrated with sulfuric acid solution using an 8.65 normal solution during the first hour and an 18.06 normal solution during the remainder of the reaction. Any vaporous effluent from the scrubber was passed in series through two additional water traps. After one hour of distillation, the reaction was stopped overnight, water from the Dean-Stark trap was added to the reactor, and the reaction again brought to temperature and continued under the indicated conditions. The temperature of the reaction mixture and of the distillation head and the amount of ammonia evolved during the course of the reaction are given in the following Table VI.

TABLE VI

| Time into distillation | | Temperature of reaction mixture (° C.) | Temperature of distillation head (° C.) | Ammonia evolved (millimoles) |
|---|---|---|---|---|
| Hours | Minutes | | | |
|  | 15 | 92 | 76 | 244.2 |
|  | 30 | 93 | 80 | 588.25 |
|  | 45 | 94 | 82 | 709.37 |
| 1 |  | 94 | 83 | 882.3 |
| 1 | 15 | 94 | 85 | 1,020.7 |
| 1 | 30 | 96 | 81 | 1,129.06 |
| 1 | 45 | 97 | 86 | 1,237.42 |
| 2 |  | 97 | 88 | 1,345.74 |
| 2 | 15 | 98 | 92 | 1,418.06 |
| 2 | 30 | 98 | 92 | 1,454.18 |
| 2 | 45 | 99 | 92 | 1,670.82 |
| 3 |  | 99 | 36 | ¹ 1,887.58 |
| 3 | 15 | 100 | 58 | 1,887.58 |
| 3 | 30 | 100 | 95 | 1,887.58 |
| 3 | 45 | 100 | 89 | 1,887.58 |
| 4 |  | 100 | 89 | 1,923.70 |
| 4 | 30 | 100 | 87 | 1,941.76 |
| 5 |  | 101 | 98 | 1,959.82 |
| 5 | 45 | 101 | 99 | 1,959.82 |
| 6 |  | 101 | 99 | 2,104.30 |

¹ 100 ml. of water was added to the reactor.

The slurry in the reaction flask was then filtered, washed with water, and the precipitate dried at 400° F. As indicated by the data of Table VI, a total of 2.104 moles of ammonia was evolved during the reaction, the yield of ammonia thus being 74.6 percent, based on the total number of moles of ammonium chloride (2.82 moles) in the solution treated.

Upon analysis of the above formed and dried lead oxychloride precipitate which weighed 751 grams, it was found to contain about 3 moles of combined lead, expressed as metal, or about 0.826 gram of combined lead per gram of precipitate, and 2.23 moles of chloride or about 2.97 millimoles of chloride per gram of precipitate. An aliquot of the precipitate was reduced with hydrogen in a reactor having a corrosion resistant alumina liner. The hydrogen feed was metered prior to being fed to the reactor. Vaporous effluent containing hydrogen chloride was collected in a first trap and the remaining effluent was passed into a second trap to collect any remaining hydrogen chloride. The effluent containing hydrogen was then passed through a second meter and recycled to the reactor. At the end of the run the contents of the first and second traps were titrated using a 0.98 normal sodium hydroxide solution. Following this procedure a 40 gram aliquot of the above formed precipitate was charged to the reactor, the system flushed with hydrogen and the temperature of the reactor raised to 500° C. over a one-half hour period. The time-temperature conditions during the course of the reduction were as follows:

TABLE VII

| Time into run | | Temperature |
| --- | --- | --- |
| Hours | Minutes | (° C.) |
|  | 30 | 500 |
|  | 45 | 690 |
| 1 |  | 720 |
| 1 | 15 | 730 |
| 2 |  | 720 |
| 2 | 15 | 760 |
| 2 | 30 | 730 |
| 2 | 45 | 720 |
| 3 |  | 720 |

Titration of the contents of the first and second traps showed that 115.76 millimoles of hydrogen chloride had been evolved during the reduction reaction, constituting a 97.4 percent yield of hydrogen chloride, based on the total chloride content (118.80 millimoles) of the 40 gram aliquot which was reduced. The weight of the solid residue at the end of the reduction was 30 grams and, since the 40 gram aliquot of precipitate contained 33.04 grams of combined lead, the lead recovered as a result of the reduction was about 90 per cent.

Figure 3:
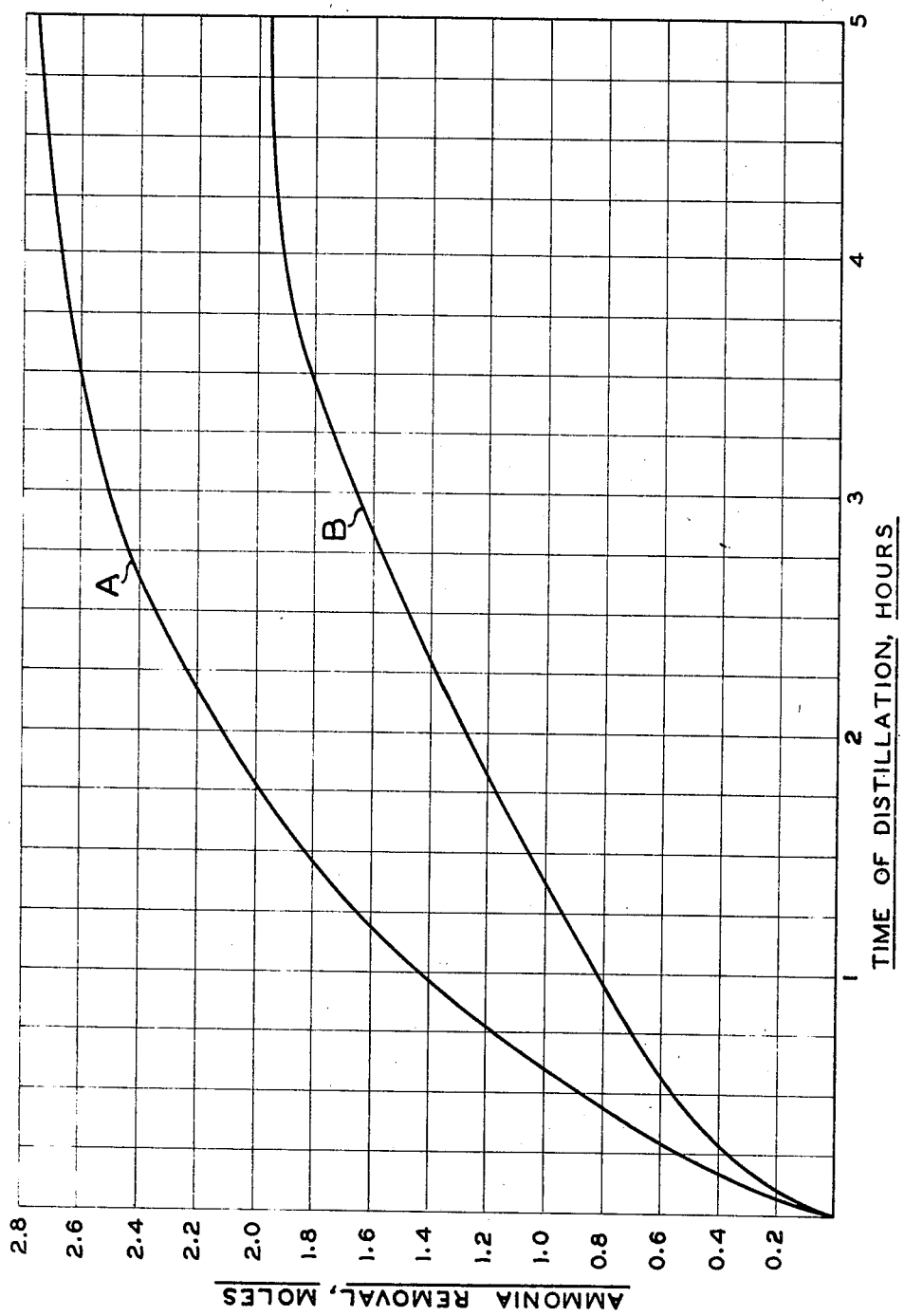

Comparison of the results of the precipitation reaction of the above Examples IV and V shows that a significantly higher yield of ammonia (97 per cent after 6 hours) was obtained in Example IV in which the initial ammonium chloride solution also contained sodium chloride, than the yield (74.6 percent after 6 hours) obtained in Example V to which no sodium chloride had been added. The advantageous effect of the presence of sodium chloride is further demonstrated by comparison of Curve A and Curve B of FIG. 3 of the accompanying drawings which illustrate the rate of ammonia removal during the course of the reactions of Examples IV and V, respectively. As is evident from Curve A of FIG. 3, the rate of removal of ammonia during the course of Example IV in which the ammonium chloride solution also contained sodium chloride, was significantly faster than the rate (Curve B) observed during the course of Example V.

EXAMPLE VI

To a one liter capacity reaction vessel fitted with a stirrer, thermometer and distillation column packed with stainless steel rings there were added 500 ml. of an aqueous solution containing 1.25 moles of ammonium chloride (2.5 molar) and 0.58 mole of sodium chloride (1.16 molar); 200 ml. of water; and 0.614 mole (137 grams) of lead oxide. The temperature of the reaction mixture was raised to 97° C. at which temperature the distillation began, and was then maintained at 100–102° C. over a period of 4 hours and 15 minutes. During the course of this reaction the mixture was stirred and the effluent was passed through a Dean-Stark trap and water scrubber in which effluent was collected and titrated with an 18.06 normal solution of sulfuric acid. As a result of the titration it was found that 614.04 millimoles of ammonia had been evolved after 2 hours and 45 minutes, no further ammonia being evolved during the last 1 hour and 30 minutes of the distillation. The reaction mixture was then cooled and filtered and the precipitate washed with water and dried. The precipitate weighed 156 grams and, upon analysis, was found to contain 585.78 millimoles of chloride or about 3.755 millimoles of chloride per gram. The calculated maximum content of combined lead in the precipitate is 614 millimoles or 3.935 millimoles (0.814 gram) per gram of precipitate. The filtrate was retreated with an additional 137 grams (614 millimoles) of lead oxide, and a second distillation was carried out over a period of 6 hours and 15 minutes at a reaction mixture temperature of 99–102° C. during which the amount of ammonia evolved was determined by titration of the effluent with a 12.43 normal solution of sulfuric acid. By this determination, it was found that an additional 578.00 millimoles of ammonia had been evolved after 4 hours and 45 minutes. The yield of total ammonia evolved was 95.3 percent, based on the ammonium chloride content (1.25 moles) of the initial solution.

A 30 gram aliquot of the precipitate formed during the initial reaction of the ammonium chloride solution with lead oxide was reduced with hydrogen in a quartz reactor having a corrosion resistant alumina liner with introduction of the hydrogen feed through an alumina sparger positioned below the level of the precipitate. The system was flushed with nitrogen while raising the temperature to 700° C. after which the hydrogen flow was initiated and continued for 50 minutes during which the temperature was 700–715° C. The hydrogen chloride evolved during the reduction was collected and, at the end of the reaction, the hydrogen chloride was titrated with a 0.996 normal solution of sodium hydroxide. This latter determination showed that 93.6 millimoles of hydrogen chloride had been evolved, the yield thereof being about 83 percent, based on the chloride content (112.6 millimoles) of the aliquot of precipitate which was reduced. The lead removed from the reactor after the reduction weighed 23.0 grams and, upon analysis, was found to consist of 99.7 weight percent elemental lead. The yield of elemental lead produced by the reduction was therefore about 93.8 percent, based on the calculated lead content (24.4 grams) of the aliquot of precipitate which was reduced.

EXAMPLE VII

To a one-liter capacity reaction vessel provided with a water cooled condenser, stirrer and thermometer there were added 250 ml. of water, 250 ml. of concentrated hydrochloric acid containing 2520 millimoles of dissolved hydrogen chloride, and 50 grams (0.89 gram atom) of iron metal (40 mesh) to form a solution of ferrous chloride. There were then added 600 grams (2.695 moles) of lead oxide (PbO) and the resulting slurry was refluxed for one hour. The reaction mixture was then cooled, filtered and the precipitate dried. The dried precipitate weighed 750 grams, the calculated divalent lead content of the precipitate being 0.74 gram (3.48 millimoles) per gram of precipitate based on the lead content (556.8 grams) in the precipitant charged to the reaction vessel. The filtrate had a pH of 4.1 and, upon analysis, was found to contain 262 millimoles of chloride. Thus the dried precipitated lead salt contains 3.01 millimoles of chloride per gram of precipitate, based on the chloride content (2520 millimoles) of the solution treated less the chloride content of the filtrate. A 50 gram aliquot of the precipitated lead salt was reduced with hydrogen in a reactor having a corrosion resistant alumina liner the hydrogen being fed through an alumina sparger. Vaporous effluent from the reactor comprising hydrogen chloride was collected in a first trap and was measured by titration with a 0.998 normal solution of sodium hydroxide. Any hydrogen chloride which did not collect in the first trap was collected in a second trap which was titrated at the end of the reaction. The reactor was first flushed with nitrogen, the hydrogen feed started and the temperature of the reactor brought to 800° C. The reactor was at a temperature of 800–810° C. for one hour and 20 minutes with continuous passage of hydrogen therethrough. As a result of the reduction, it was found that 132.7 millimoles of hydrogen chloride had collected in the first trap and that an additional 17 millimoles had collected in the second trap for a total hydrogen chloride recovery of 149.7 millimoles. Since the 50 gram aliquot of precipitate which was reduced contained 150.5 millimoles of chloride, the yield of chloride recovered as hydrogen chloride from the precipitate was about 99 percent. The solid lead containing residue recovered at the end of the reduction also contained magnetic iron oxide at least a portion of which was separated by brushing the residue with a magnet, the remaining residue having a weight of 31.2 grams.

EXAMPLE VIII

To a one-liter capacity reaction vessel provided with a stirrer and water cooled condenser there were added 500 ml. of a sulfuric acid waste liquor obtained by extracting titania from ilmenite ore with sulfuric acid. The waste liquor which had a specific gravity of 1.272, contained 321 grams of total sulfate, expressed as sulfuric acid ($H_2SO_4$), and the following individual components on a grams per liter basis: 249 grams of active sulfuric acid; 8 grams of soluble titanium dioxide; 62 grams of ferrous sulfate; 0.2 gram of chromium oxide; 0.9 gram of vanadium oxide; and 2.2 grams of each of magnesium sulfate and aluminum sulfate. This waste liquor was heated to reflux temperature and then 400 grams (1.795 millimoles) of lead oxide were added followed by refluxing for an additional one hour period. The mixture was then cooled, filtered and the resulting precipitate was washed with 100 ml. of water. The precipitate weighed 544 grams and, upon analysis, was found to contain 0.654 gram (3.17 millimoles) of combined lead per gram and 3.05 millimoles of sulfate per gram, expressed as $H_2SO_4$. A 50 gram sample of the precipitate was treated with nitrogen and hydrogen in a corrosion resistant reactor. Effluent evolved during this treatment was first passed through a trap containing an aqueous solution of copper sulfate in order to recover any sulfur value evolved as hydrogen sulfide in the form of copper sulfide. The effluent was then passed into a second trap in which it was titrated with a 0.998 normal aqueous solution of sodium hydroxide in order to determine the amount of sulfur evolved. Following this procedure, the temperature of the reactor was raised slowly to 900° C. and maintained at that temperature for 1 hour and 25 minutes with nitrogen flow-through. The temperature was then raised to 920° C. and hydrogen feed introduced.

The temperature was raised to and maintained at 950° C. for about 15 minutes, and then increased to and maintained at 970–975° C. for another 15 minute period, and lowered to 900° C., the changes in temperature being carried out over 15 minute intervals. As a result of this treatment, it was found that 114.8 millimoles of sulfur dioxide and 31.5 millimoles of hydrogen sulfide had been evolved for a total recovery of 146.3 millimoles of sulfur value. Since the 50 gram aliquot of precipitate contained 152.5 millimoles of sulfate, the yield of sulfur value recovered was 95.8 percent. The weight of lead-containing residue regained after the above treatment was 29 grams and, since the 50 gram aliquot of precipitate contained 32.7 grams of combined lead, the recovery was about 88 percent.

EXAMPLE IX

To a one-liter capacity reaction vessel provided with a stirrer, water-cooled condenser and thermometer there were added 500 ml. of a sulfuric acid waste liquor having the composition described above under Example VIII. The solution was heated to 85° C. and 2.47 moles (550 grams) of lead oxide were then added. The mixture was heated to reflux temperature and refluxed for one hour after which the mixture was cooled and filtered. A sample of the filtrate was analyzed and found to contain only 1.3 parts per million of lead ion. The sulfur value of the precipitate is recoverable as described above under Example VIII.

EXAMPLE X

To a one-liter capacity reaction vessel provided with a water cooled condenser, stirrer and thermometer there was added a solution prepared by dissolving 47 grams of phenol in 500 ml. of water and having a pH of 2.5. The solution was heated to 60° C. with rapid agitation and there were then added 226 grams of lead oxide. The mixture was refluxed for one hour and was then cooled and filtered. Analysis of the filtrate using a standard potassium bromate-sodium thiosulfate analytical test for phenol showed the filtrate to contain 6.53 millimoles of phenol. Since the original solution contained 500 millimoles of phenol and, since only 6.53 remained in the filtrate, about 98.7 percent of the phenol contained in the initial solution was removed as precipitated lead salt. The lead value of the precipitated lead salt is recoverable by treatment with hydrogen as described in the previous examples.

Figure 2:
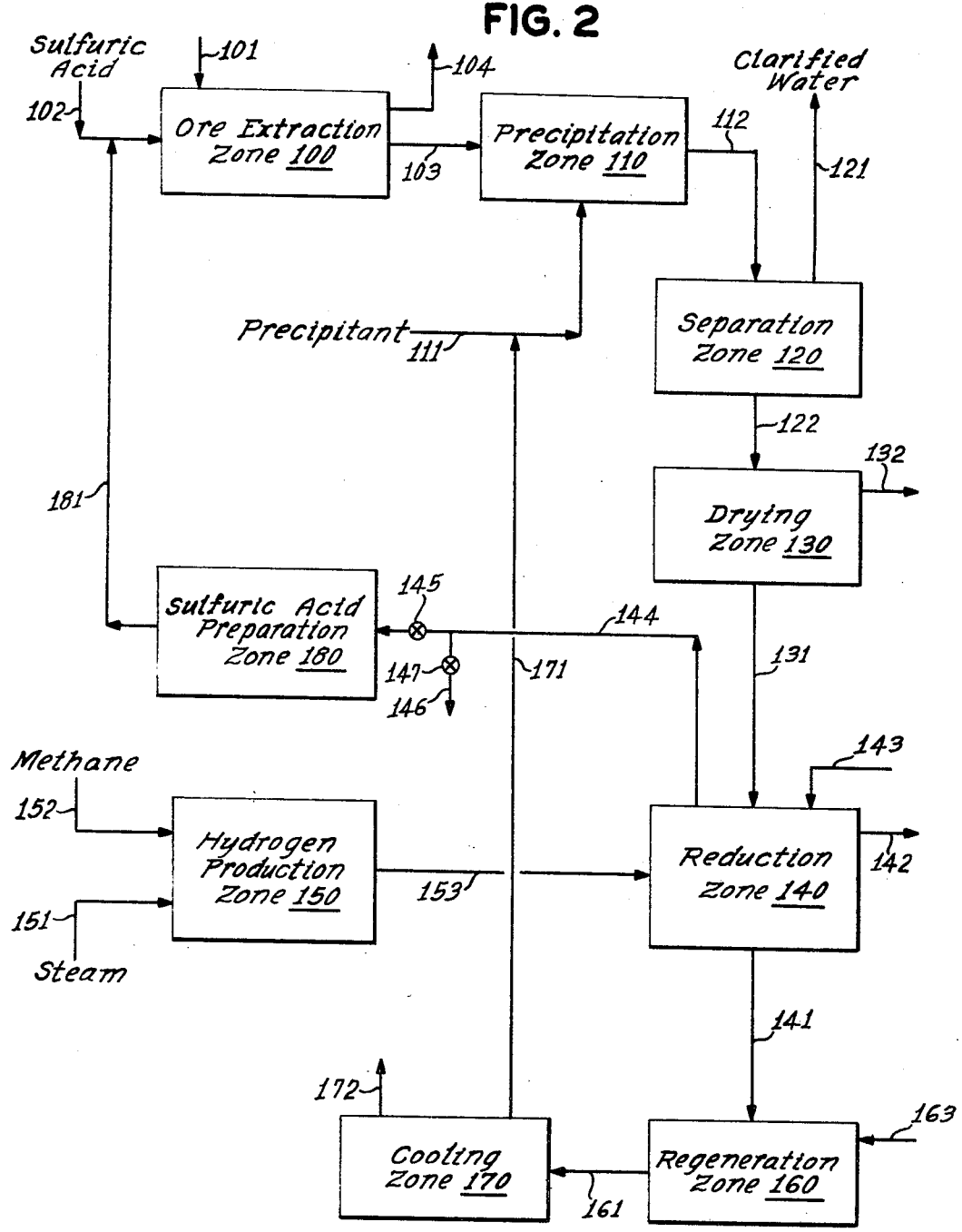

It is to be understood that the elemental lead formed by treatment with hydrogen of the various precipitated lead salts of the above specific examples is readily converted to the precipitant form by oxidation as described herein and as specifically exemplified in connection with the operation of zones 65 and 160 of FIGS. 1 and 2, respectively, such that the regenerated precipitant may then be re-used in the precipitation step of the process.

From the teachings of this invention it is evident that a novel continuous, cyclic method is provided for removing various contaminants from aqueous solutions thereof to provide non-polluted water and for converting contaminant to a valuable product of the process such as phosphorus, sulfur dioxide, ammonia and hydrogen halide. Although the invention as described herein includes conversion of the precipitated lead salt to elemental lead preferably in the molten phase and regeneration of the precipitant from the elemental lead, certain embodiments of the process may be modified by thermally decomposing the precipitated lead salt to regenerate the precipitant such as lead oxide directly. For example, in the embodiment of the invention illustrated by FIG. 2, the dried lead sulfate precipitate from zone 130 may be passed directly to regeneration zone 160 in which the precipitated lead salt is thermally decomposed to convert the salt to lead oxide and sulfur dioxide in accordance with the reaction of the following equation.

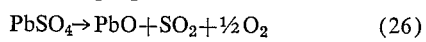

$$PbSO_4 \rightarrow PbO + SO_2 + \tfrac{1}{2} O_2 \qquad (26)$$

The sulfur dioxide product is withdrawn from the thermal decomposition regeneration zone and recovered or utilized for sulfuric acid manufacture as described above. When the precipitant is regenerated by thermal decomposition, any iron oxide which is present in the precipitate is separated from the regenerated lead oxide by magnetic separation prior to recycling of the precipitant to the precipitation zone.

Various alterations and modifications of the process of this invention may become apparent to those skilled in the art without departing from the scope of this invention.

What is claimed is:

1. A cyclic process for the treatment of an aqueous medium having an acid radical dissolved therein to decrease the content of dissolved acid radical which comprises reacting an aqueous medium having an acid radical dissolved therein with a precipitant comprising at least one lead compound selected from the group consisting of lead oxide and basic lead carbonate to form a precipitate of lead and the acid radical thereby decreasing the content of dissolved acid radical in the aqueous medium, reacting the precipitate with a reducing medium to form elemental lead, reacting the elemental lead in an oxidizing medium to regenerate one of the aforesaid precipitants, and passing said regenerated precipitant to the precipitation step.

2. The process of claim 1 in which said acid radical is phosphate.

3. The process of claim 1 in which said acid radical is sulfate.

4. The process of claim 1 in which said acid radical is halide.

5. The process of claim 4 in which said halide is chloride.

6. The process of claim 1 in which said acid radical is derived from a carboxylic acid.

7. The process of claim 1 in which said acid radical is derived from a phenol.

8. The process of claim 1 in which said acid radical is in association with a hydrogen cation.

9. The process of claim 1 in which said acid radical is in association with an ammonium cation.

10. The process of claim 1 in which said acid radical is in association with a heavy metal cation.

11. The process of claim 10 in which said metal is iron.

12. The process of claim 1 in which said acid radical is in association with an alkaline earth metal cation.

13. A cyclic process for the treatment of an aqueous medium having an acid radical dissolved therein to decrease the content of dissolved acid radical which comprises reacting in a precipitation zone an aqueous medium having a compound comprising an acid radical dissolved therein with a precipitant comprising at least one lead compound selected from the group consisting of lead oxide and basic lead carbonate to form a precipitate comprising lead and said acid radical, separating said precepitate from said aqueous medium, passing said precipitate to a reduction zone, in said reduction zone reacting the precipitate in the presence of a reducing gas under conditions such that elemental lead and a second product comprising at least a constituent portion of the acid radical are formed, passing said elemental lead to a regeneration zone, in said regeneration zone reacting the elemental lead in an oxidizing medium such that elemental lead is converted to at least one of said precipitant forms, withdrawing the regenerated precipitant from said regeneration zone, passing the regenerated precipitant to the precipitation zone, and withdrawing from said precipitation zone aqueous medium substantially free of said acid radical.

14. A process for the purification of aqueous media which comprises treating an aqueous medium having dissolved therein a mineral acid and an iron salt with a reactant comprising a lead compound selected from at least one of the group consisting of lead oxide and basic lead carbonate to form a precipitate comprising lead and an anion derived from the mineral acid and a water insoluble iron compound, passing the said precipitate including said water insoluble iron compound to a reduction zone in which the precipitate is treated with a reducing environment at a temperature between about 500° C. and about 1000° C. to form elemental lead in the molten phase, separating a solid phase containing said water insoluble iron compound from said molten lead, passing said elemental lead to a regeneration zone in which elemental lead is reconverted to at least one of said lead oxide and basic lead carbonate forms.

15. The process of claim 14 in which said mineral acid is hydrochloric acid.

16. The process of claim 14 in which said mineral acid is sulfuric acid.

17. A process for the removal of sulfate from solutions containing the same which comprises reacting an aqueous solution having a sulfate compound dissolved therein with a precipitant selected from at least one of the group consisting of lead oxide and basic lead carbonate to form a precipitate comprising lead sulfate, separating the precipitate from said aqueous medium, passing the precipitate to a reduction zone in which the precipitate is reacted with a reducing medium to form elemental lead and effluent comprising sulfur dioxide, reacting said elemental lead in the presence of a gas comprising oxygen to regenerate at least one of the aforesaid precipitants, passing the regenerated precipitant to said precipitation zone, and recovering said effluent comprising sulfur dioxide from said reduction zone.

18. The process of claim 17 in which said sulfate compound dissolved in the aqueous solution is ammonium sulfate.

19. The process of claim 17 in which said aqueous solution which is reacted with the precipitant comprises sulfuric acid and iron sulfate.

20. A cyclic process for the treatment of an aqueous medium having an ammonium halide dissolved therein to lower the content of dissolved ammonium halide which comprises reacting in a precipitation zone an aqueous solution comprising ammonium halide with a precipitant comprising a lead compound selected from at least one of the group consisting of lead oxide and basic lead carbonate to provide ammonia and a precipitate comprising lead oxyhalide thereby lowering the content of dissolved ammonium halide in said solution, reducing said precipitate in a reduction zone with a hydrogen-containing gas to provide hydrogen-halide and elemental lead, converting said elemental lead to said precipitant and recycling the precipitant to the precipitation zone, withdrawing effluent from said precipitation zone comprising ammonia, withdrawing effluent comprising hydrogen halide from said reduction zone and recovering ammonia and hydrogen halide as products of the process.

21. The process of claim 20 in which said ammonium halide is ammonium chloride and the hydrogen halide recovered as a product of the process is hydrogen chloride.

22. The process of claim 20 in which said solution comprising ammonium halide has an alkaline metal salt dissolved therein.

23. The method of claim 22 in which said alkaline metal salt is an alkali metal halide.

24. The process of claim 22 in which said alkaline metal salt is an alkaline earth metal halide.

25. A cyclic process for the treatment of an aqueous medium having a phosphate-containing compound dissolved therein which comprises reacting an aqueous solution having a phosphate-containing compound dissolved therein with a precipitant selected from at least one of the group consisting of lead oxide and basic lead carbonate to form a precipitate comprising lead phosphate, reducing said lead phosphate to produce phosphorus product and elemental lead, regenerating said elemental lead to form one of said precipitants and recycling the regenerated precipitant for further precipitation of lead phosphate.

26. The process of claim 25 in which the mole ratio of precipitant, expressed as PbO, to phosphate radical contained in the aqueous solution is less than about 3:2 such that the formation of lead orthophosphate is minimized.

27. A cyclic process for treatment of an aqueous solution of phosphoric acid to lower the content of dissolved phosphate radical and to produce phosphorus which comprises acidulating phosphate rock ore with an aqueous solution of a strong mineral acid to produce aqueous phosphoric acid, introducing a precipitant selected from at least one of the group consisting of lead oxide and basic lead carbonate into said aqueous phosphoric acid to precipitate lead phosphate, reducing said lead phosphate to obtain elemental phosphorus and elemental lead, reacting said lead under oxidizing conditions to regenerate one of said precipitants and recycling the precipitant for precipitation of lead phosphate.

28. The process of claim 27 in which said strong mineral acid is selected from the group consisting of sulfuric acid, hydrochloric acid, nitric acid, and hydrofluoric acid.

29. The process of claim 27 in which said strong mineral acid comprises sulfuric acid.

30. The process of claim 27 in which the phosphoric acid solution which is treated is produced by acidulating phosphate rock ore in a comminuted form with a relatively dilute solution of sulfuric acid as said mineral acid, separating the dilute solution of phosphoric acid thereby produced from gypsum and insolubles and passing said dilute solution of phosphoric acid to said precipitation step, and in which said precipitate comprising lead phosphate is contacted with a reducing gas under conditions to produce elemental phosphorus and lead therefrom.

31. The process of claim 30 in which said sulfuric acid is prepared by the catalytic oxidation of sulfur dioxide to produce sulfuric acid in dilute aqueous solution.

32. The process of claim 30 in which said sulfuric acid is produced by catalytic oxidation in a dilute aqueous solution having a concentration between about 10 and about 40 percent by weight $H_2SO_4$.

33. The process of claim 30 in which said precipitant is passed in countercurrent contact with said phosphoric acid to obtain a precipitate comprising lead pyrophosphate and to minimize formation of lead orthophosphate.

34. The process of claim 30 in which said reducing gas comprises hydrogen.

35. A cyclic process for the purification of an aqueous medium containing a dissolved alkaline earth metal salt in which the alkaline earth metal cation is in association with an acid radical which comprises reacting in a precipitation zone said aqueous medium with a precipitant comprising a lead compound selected from at least one of the group consisting of lead oxide and basic lead carbonate in the presence of carbon dioxide added to said zone to form a precipitate comprising a lead salt of said acid radical and an alkaline earth metal carbonate thereby decreasing the content of dissolved alkaline earth metal salt in said aqueous medium, separating precipitate from said aqueous medium, reacting precipitate with a reducing medium to form elemental lead, reacting the elemental lead in an oxidizing medium to regenerate one of the aforesaid precipitants, and passing said regenerated precipitant to said precipitation step.

36. The process of claim 35 in which said alkaline earth metal salt is an alkaline earth metal chloride.

37. A cyclic process for the treatment of an aqueous medium having an acid radical dissolved therein to decrease the content of dissolved acid radical which comprises reacting in a precipitation zone lead oxide precipitant and an aqueous medium having a compound comprising an acid radical dissolved therein in the presence of carbon dioxide to convert at least a portion of the lead oxide to basic lead carbonate thereby forming a precipitate comprising lead and said acid radical, separating said precipitate from said aqueous medium, passing said precipitate to a reduction zone, in said reduction zone reacting the precipitate in the presence of a reducing gas under conditions such that elemental lead and a second product comprising at least a constituent portion of the acid radical are formed, passing said elemental lead to a regeneration zone, in said regeneration zone, reacting the elemental lead in an oxidizing medium such that elemental lead is converted to said precipitant, withdrawing regenerated precipitant from said regeneration zone, passing regenerated precipitant to the precipitation zone, and withdrawing from said precipitation zone aqueous medium substantially free of said acid radical.

38. A cyclic process for the treatment of an aqueous medium having an acid radical dissolved therein to decrease the content of dissolved acid radical which comprises reacting in a precipitation zone in an aqueous medium having a compound comprising an acid radical dissolved therein with a precipitant comprising at least one lead compound selected from the group consisting of lead oxide and basic lead carbonate to form a solid phase comprising a precipitated lead salt of the acid radical thereby decreasing the content of dissolved acid radical in the treated aqueous medium, separating said solid phase from said treated aqueous medium, passing said separated solid phase to a reduction zone, in said reduction zone reacting said solid phase with a gaseous reducing medium at a temperature between about 500° C. and about 1000° C. to form elemental lead in the molten phase, passing the molten lead to an oxidation zone, in said oxidation zone reacting elemental lead in an oxidizing medium under conditions such that one of the aforesaid precipitants is regenerated, and passing said regenerated precipitant to said precipitation zone.

39. The process of claim 38 in which said compound comprising an acid radical is a mineral acid.

References Cited

UNITED STATES PATENTS

| | | | |
|---|---|---|---|
| 3,337,452 | 8/1967 | Teske et al. | 210—45 |
| 1,106,794 | 8/1914 | Euston | 23—71 |
| 1,163,052 | 12/1915 | White et al. | 23—71 |
| 1,532,419 | 4/1925 | Lloyd et al. | 23—71 |
| 1,617,098 | 2/1927 | Blumenberg | 23—105 |
| 1,885,447 | 1/1932 | Jolibois et al. | 23—105 XR |
| 2,103,007 | 12/1937 | Hunsdiecker | 23—105 |
| 2,660,525 | 11/1953 | Foster | 75—77 |
| 3,230,037 | 1/1966 | Kunz | 23—71 |
| 3,323,859 | 6/1967 | Szczepanek et al. | 23—105 XR |

OTHER REFERENCES

J. W. Mellor: "A Comprehensive Treatise on Inorganic and Theoretical Chemistry," vol. 7, pages 878, 879 and 885. Longmans, Green & Co., New York.

EDWARD STERN, Primary Examiner

U.S. Cl. X.R.

23—97, 105, 122, 146, 154, 165, 167, 168, 177, 193, 223; 75—77; 210—45